United States Patent [19]
Richards

[11] 3,913,966
[45] Oct. 21, 1975

[54] TONGS FOR SUSPENDING GLASS

[75] Inventor: Peter Henry Richards, Kenilworth, England

[73] Assignee: Triplex Safety Glass Company Limited, London, England

[22] Filed: Mar. 12, 1974

[21] Appl. No.: 450,369

[30] Foreign Application Priority Data
July 20, 1973 United Kingdom............... 34702/73

[52] U.S. Cl................. 294/118; 294/87 R; 294/115
[51] Int. Cl.²......................................... B66C 1/48
[58] Field of Search............ 294/81 R, 87 R, 87.22, 294/87.24, 106, 111, 112, 115, 118, 119; 65/106, 260, 273

[56] References Cited
UNITED STATES PATENTS

| | | | |
|---|---|---|---|
| 1,220,899 | 3/1917 | Sorensen............................ | 294/115 |
| 1,580,416 | 4/1926 | Cromwell et al. .................. | 294/115 |
| 2,174,254 | 9/1939 | Black................................. | 294/118 X |
| 2,277,828 | 3/1942 | Morgan.............................. | 294/87 R |
| 2,524,880 | 10/1950 | Cattonar et al............. | 294/87.22 X |
| 2,710,493 | 6/1955 | Glynn............................... | 294/119 |
| 3,021,169 | 2/1962 | Harry................................ | 294/115 |
| 3,158,275 | 11/1964 | Hart............................. | 294/87 R X |
| 3,410,597 | 11/1968 | Skelding........................... | 294/118 |

*Primary Examiner*—Evon C. Blunk
*Assistant Examiner*—Johnny D. Cherry
*Attorney, Agent, or Firm*—Burns, Doane, Swecker & Mathis

[57] ABSTRACT

Tongs for suspending glass comprise an elongate suspension member the upper end of which is for fixing relative to a tong bar. A pair of tong arms are pivoted about a pivot on the suspension member which pivot is at a fixed distance from the upper end of the suspension member. The tong arms extend beyond the pivot as tong jaws and tong links connected to the tong arms are also connected to a biassed member which is effective through the links to close the tong jaws in the rest position of the biassed member. A number of such tongs are fixed to a tong bar, being spaced apart along the bar and lifting means connected to the biassed member is operated by actuating means at one or the other end of the tong bar when the tong jaws are to be opened.

31 Claims, 17 Drawing Figures

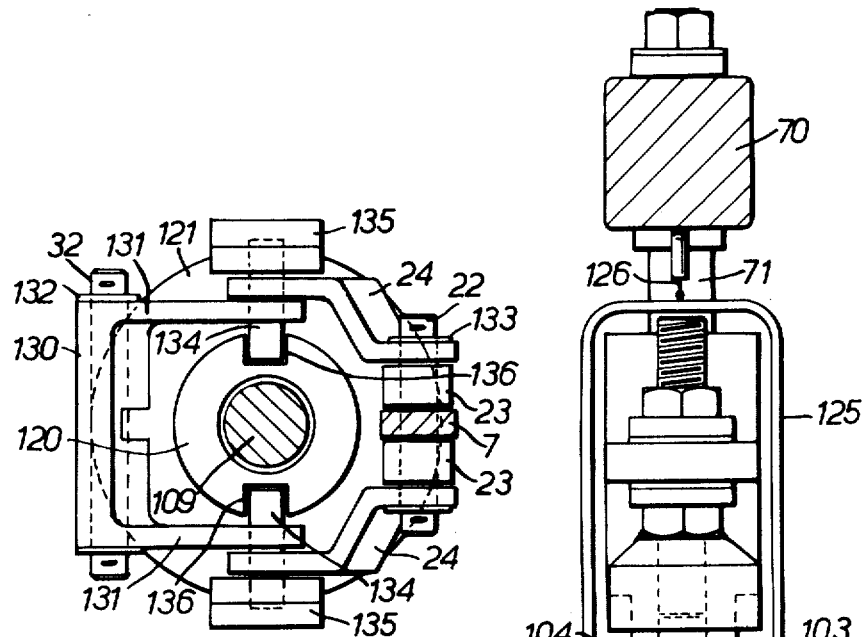
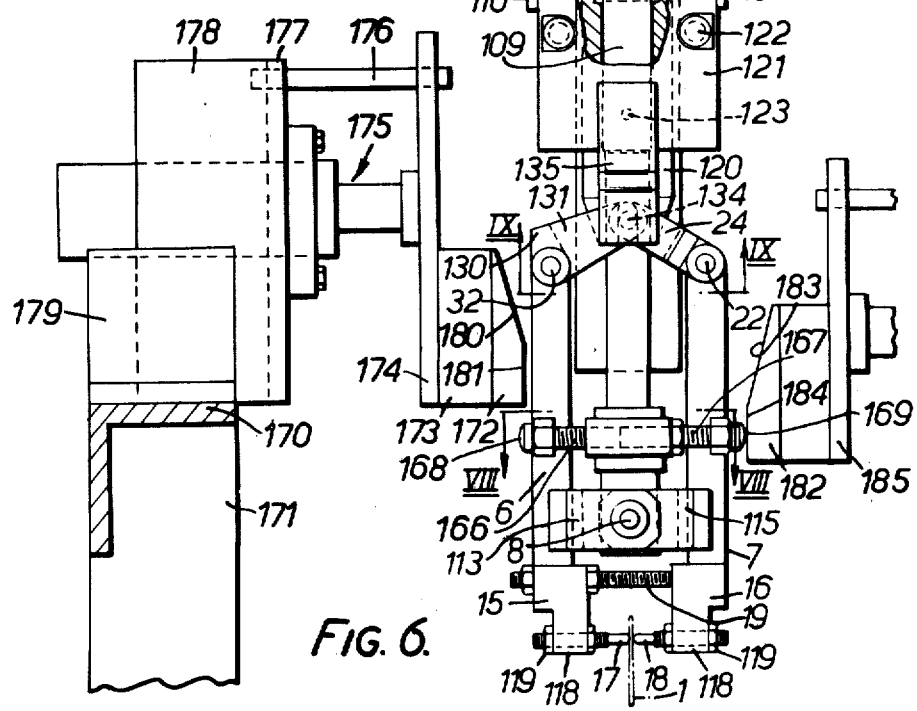
FIG. 9.
FIG. 6.

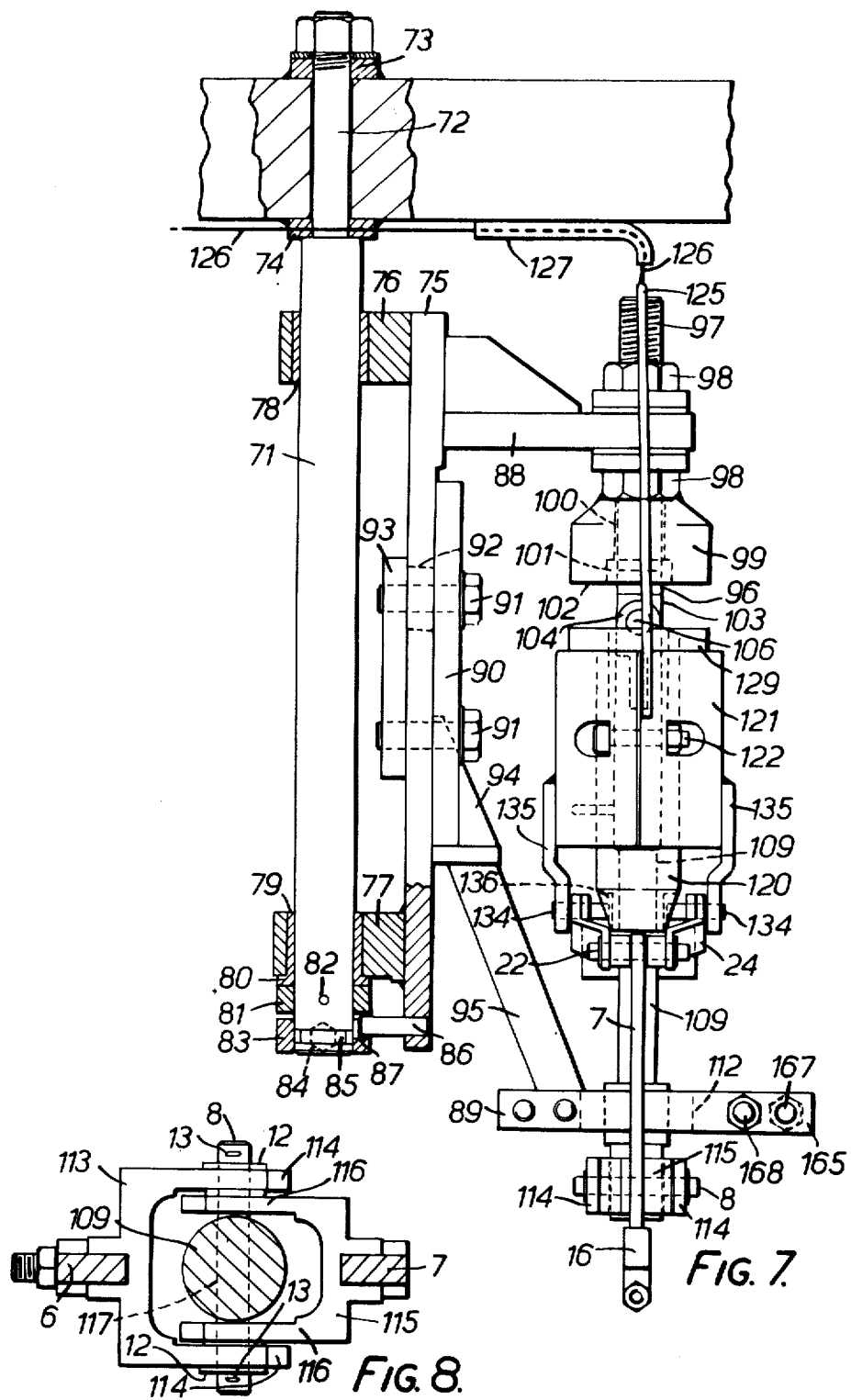

TONGS FOR SUSPENDING GLASS

BACKGROUND OF THE INVENTION

1. Field of the Invention

This invention relates to tongs for suspending glass and in particular to tongs for suspending glass sheets in a vertical disposition.

It is usual in the heat treatment of sheet glass for subsequent toughening or for subsequent bending and toughening, to suspend the sheets of glass generally vertically from a number of tongs which engage and grip the upper edge of the sheet.

2. Description of the Prior Art

It is well known to use tongs for suspending sheets of glass in this manner, with a number of spaced tongs suspended from a tong bar which is itself suspended from a hoist or a conveyor, each of the tongs of conventional kind comprising a pair of self-closing tong arms pivoted together in scissors-fashion near their lower ends by a pivot pin and extended beyond the pivot pin to form the jaws of the tongs which usually carry axially adjustable pins formed for example of heat-resisting steel, which engage the surfaces of the glass. With conventional tongs it has been necessary to insert the upper edge of a sheet of glass between the jaws of the tongs and then allow the downward action of gravity on the tong arms and on the glass sheet to cause the gripping of the glass sheet between the tong jaws. As the tongs close the pivot pin moves downwardly and the tong points move through a curved path so that in the course of gripping the upper edge of a sheet of glass between the tong jaws the glass sheet must move downwardly relative to a fixed point of suspension of the tongs. It has therefore not been possible hitherto to employ suspension tongs to pick up a glass sheet at a fixed location.

SUMMARY

It is a main object of the present invention to provide suspension tongs which can pick up a glass sheet at a location which is at a fixed spacing from the tong suspension level.

The invention provides tongs for suspending glass which tongs comprise an elongated suspension member adapted for fixing at its upper end to a tong bar. A pair of tong arms are pivoted about a pivot on the suspension member at a fixed distance from its upper end and the tong arms extend beyond the pivot to form jaws of the tongs. Tong links are pivotally connected to the tong arms and are pivotally connected to a biassed member which tong links are arranged to close the jaws in the rest position of the biassed member.

Preferably the biassed member is a weighted slider which is slideable on the suspension member and lifting means is attached to the slider and is operable to raise the slider and open the tong jaws.

Since the vertical spacing of the pivot for the tong jaws relative to the suspension member is defined, no lowering of the tong jaws relative to the suspension member is necessary in order to achieve a grip on the upper edge of a glass sheet.

The tongs may be suspended in a tong gate which includes a pivot which is fixed to a tong bar. In this way the tongs can be guided into position above the upper edge of a glass sheet, particularly when the glass sheet is being bent and the tongs are being guided to a position in which their jaws exactly straddle the upper edge of the bent glass sheet. A number of such tongs each suspended in a tong gate may be employed spaced along a tong bar and operated by actuating means at the ends of the tong bar.

BRIEF DESCRIPTION OF THE DRAWINGS

Some embodiments of the invention will now be described, by way of example, with reference to the accompanying drawings in which:

FIG. 6 is a front elevation of a second form of suspension tongs in accordance with the invention also showing the tongs suspended in a tong gate which is fixed to a tong bar and a sheet of glass gripped between the tong jaws, FIG. 7 is a side elevation of the tongs of FIG. 6, FIG. 8 is a section along the line VIII—VIII in FIG. 6, FIG. 9 is a section along the line IX—IX in FIG. 6.

DESCRIPTION OF THE PREFERRED EMBODIMENTS

Figure 1:
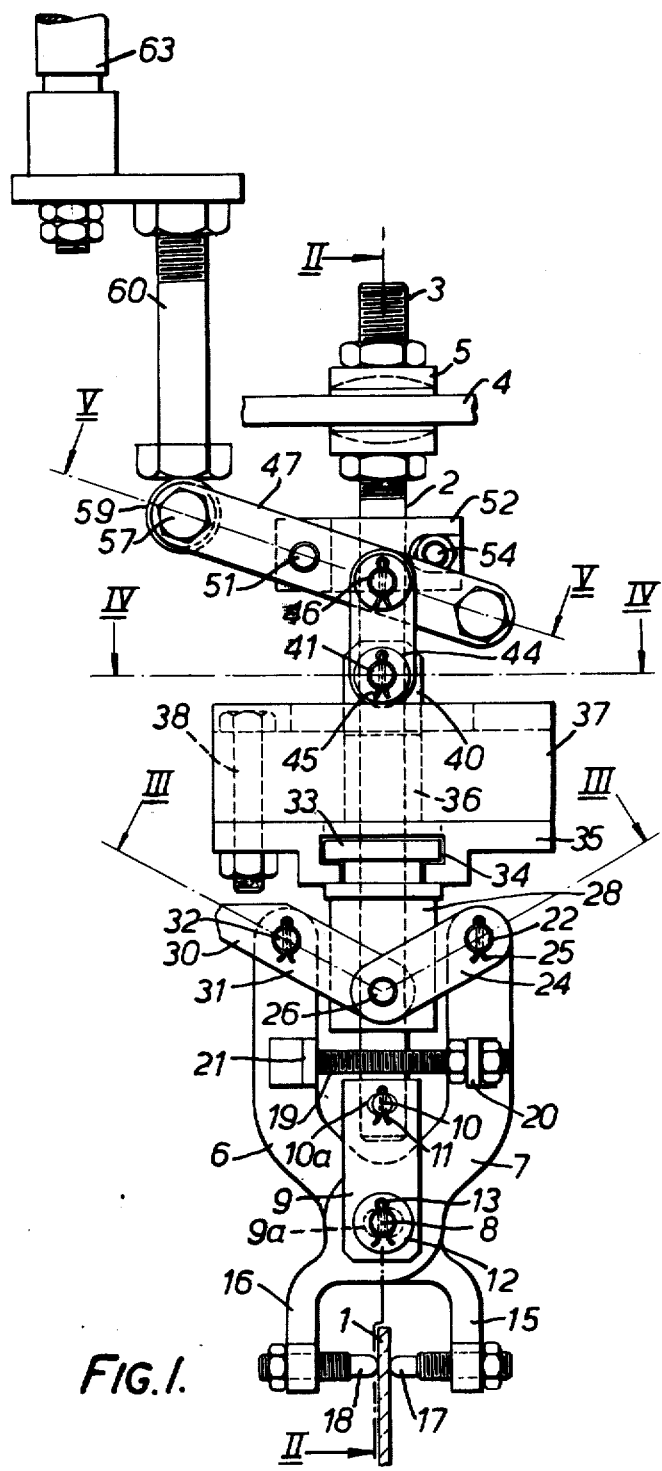
FIG. 1 is a side elevation of one embodiment of suspension tongs according to the invention showing the tongs fixed to a tong bar and a sheet of glass gripped between the tong jaws.

In the drawings the same references indicate the same or similar parts.

Referring to FIGS. 1 to 5 of the drawings, a sheet of glass 1 is gripped between the jaws of tongs according to the invention which comprise a central elongated suspension member which is a straight bar 2 of heat-resistant steel. The bar 2 is threaded at its upper end, as indicated at 3, and is fixed to a tong bar 4 by a spherical seating of known kind indicated at 5.

The tongs comprise a pair of tong arms 6 and 7 which are pivoted together by a pivot pin 8 and cross at the pivot pin. The pivot pin 8 hangs by means of straps 9 from a fixing pin 10 which passes through transverse slots 10a in the upper ends of the straps 9 and through a bore in the lower end of the suspension bar 2. The pin 10 is maintained in position by split pins 11.

The pivot pin 8 passes through transverse slots 9a in the lower ends of the straps 9 and is retained in position by means of stainless steel washers 12 with co-operating split pins 13 which pass through holes in the hinge pin 8.

Mounted on the pivot pin 8 between the straps 9 is a bushing 14 of stepped diameter which forms a bearing for the tong arms 6 and 7.

The tong arms extend beyond and below the pivot pin 8 to form the jaws 15 and 16 of the tongs and the jaws carry axially adjustable pins 17 and 18 of heat-resisting steel which are held in position by lock nuts in conventional manner, and which have rounded points which engage with the surfaces of the suspended glass sheet 1 and penetrate a short distance into the surfaces of glass sheet when the glass sheet is hot, for example at a bending temperature of about 600°C or a pre-quenching temperature of about 700°C to 750°C. The depth of penetration of the tong points into the surfaces of the glass sheet is determined by a settable stop bolt 19 which is locked to a bracket 20 on the tong arm 7 by adjustable nuts and whose free end bears against a stop bracket 21 which extends from the face of the other tong arm 6. The length of extension of the bolt 19 from the arm 7 towards the arm 6 sets the gap between the tong jaws when they are closed on a hot glass sheet and thereby determines the depth of penetration of the tong points into the sheet surfaces.

This form of suspension of the pivot pin 8 by the straps 9 from the lower end of the suspension bar 2, whose upper end is fixed to the tong bar 4, determines that the pivot pin 8 for the tong arms is at a fixed distance from the upper end of the bar 2 and also from the tong bar 4, and does not move downwardly when the jaws are closed to grip a glass sheet.

At its upper end the tong arm 7 is freely pivoted on a pivot pin 22, between two spacer elements 23. Also freely mounted on the ends of the pivot pin 22 are two tong links 24 and the whole assembly on the pivot pin 22 is held in position by stainless steel split pins 25. The tong links 24 are mounted at their other ends on further pivot pins 26 which extend inwardly into transverse slots 27 in a sleeve 28 of rectangular cross-section which slides freely on the suspension bar 2 and forms part of a weighted slider which constitutes a biassed member which closes the tong jaws.

The upper end of the tong arm 6 is located in a slot 29 in a tong link plate 30 which is formed with two arms 31 which extend inwardly alongside the slider sleeve 28 and are freely pivoted on the pivot pins 26. A further pivot pin 32 passes through the link plate 30 and the upper end of the tong arm 6 is freely pivoted on the pin 32. By this construction, which is shown in detail in FIG. 3, the upper ends of the tong arms are pivotally connected to tong links which converge downwardly to pivot pin 26 on the weighted slider sleeve 28.

The upper end of the sleeve 28 is formed with a head 33 which is fitted into a recess 34 in a support plate 35 which has a central bushing 36 which is slidable on the bar 2. A weight member 37 is fixed by bolts 38 to the plate 35 and is thereby fixed to the sleeve 28.

Welded to a recess 39 in the upper face of the weight 37 are lugs 40 which extend upwardly and carry pivot pins 41 which have heads 42 bearing against the inside surface of the lugs 40 and which pass through apertures in the lower ends of suspension straps 43. Washers 44 and split pins 45 hold the assembly together. At their upper ends the suspension straps 43 hang from further pivot pins 46 which pass through side member 47 of a rocking frame. The pivot pins 46 have heads 48 which bear against the inner surfaces of the side members 47 of the rocking frame and washers 49 and split pins 50 retain the straps 43 on the pins 46.

Figure 5:
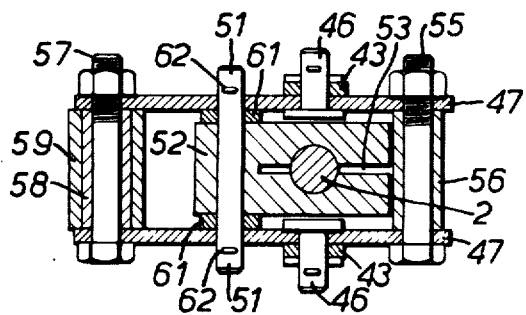
FIG. 5 is a section on line V—V of FIG. 1 showing in particular a rocking frame mechanism for opening of the tongs.

The rocking frame is more clearly illustrated in FIG. 5 which shows how the side members 47 of the frame are pivoted on an offset pivot pin 51 which is fixed in a split collar 52 which is secured on the suspension bar 2. The split in the collar 52 is indicated at 53 and the collar is secured by means of a screw 54 shown in FIG. 1. The pivot pin 51 is offset with respect to the suspension bar 2 and to the pivot pins 46 which are located on either side of the bar 2.

The rocking frame is completed by a bolt 55 threaded through a spacer sleeve 56 between the two ends of the side members 47 at the side of the rocking frame away from the pivot 51. At the side of the rocking frame near the pivot 51 a bolt 57 is threaded through a spacer sleeve 58 similar to the sleeve 56 and carries an outer sleeve 59 to be engaged by a downwardly movable tong-actuating member 60 which is indicated in full lines in FIG. 1.

The side members 47 of the rocking frame are spaced from the collar 52 by spacer members 61 and the pivot pin is retained by split pins 62. The whole of the construction is loosely jointed and held by means of split pins in conventional manner in the construction of glass suspension tongs so as to permit freely the expansion of the members which necessarily takes place during the temperature changes which the tongs undergo.

In a glass handling system employing tongs according to the invention, the tong bar 4 is fitted with a number of tongs, for example six tongs, at spaced intervals along its length. The tong bar 4 is attached to a lifting hoist by means of which the tong bar can be raised and lowered. With the tong bar 4 raised by the hoist and with a glass sheet 1 independently supported in upright position at a station below the tong bar, the tong actuating member 60, which is indicated as being connected to a hydraulic operating mechanism 63, is pressed downwardly. The side of the rocking frame which is normally rocked upwardly under the action of the weighted slider which pushes the pivot pins 26 downwardly to a position below the level of the upper ends of the tong arms, is depressed to raise the weighted slider which hangs from the straps 43, thereby raising the pivot pins 26 and causing the tong arms 6 and 7 to move apart and the tong jaws to open. The tong bar 4 is then lowered and the tongs are guided as they are lowered until the open tong jaws of a series of tongs are in position with the upper edge of the glass sheet located between the pins 17 and 18 of the tong jaws.

The tong actuating member 60 is then raised, the weighted slider pushes the pivot pin 26 downwardly under the action of gravity and the tong jaws close pressing the tong points 17 and 18 against the surfaces of the glass to grip the glass sheet. Throughout this operation the pivot pin 8 and the fixing pin 10 cannot move vertically but only transversely in the slots in which they are located, and the only movement of the tong jaws is their pivoting about the stationary pivot pin 8.

During the subsequent movement of the tongs carrying the glass sheet the weights 37 maintain the tong jaws closed and the glass sheet gripped.

In the embodiment illustrated the pivot pins 26 are shown extending outwardly so that they can be engaged by means operable to lift the pivot pins 26 and thereby lift the sleeve 28 and cause the jaws to open. This feature of the tongs is of use in particular in operations when after heating, or heating and bending, the hot glass sheet is being lowered to a quenching operation where it can be released by the engagement of the pivot pins 26 with suitably positioned tong opening means for example V-shaped members of known kind which receive the outward extension of the pins 26.

Further it will be seen that the pivot pin 8 for the tong arms extends outwardly and this is of use when a set of tongs is being lowered to a position ready for engagement over the upper edge of a glass sheet which is being vertically advanced between the opened tongs. The sideways extensions of the hinge pin 8 assists the location of the tongs in an exact position for example is specially positioned locating grooves.

FIGS. 6 to 9 illustrate another embodiment of tongs according to the invention which tongs are for suspension in pivoting tong gates which are fixed to a tong bar. The tong gates co-operate with tong guide means to bring the jaws of the tongs into exact location over the upper edge of a glass sheet prior to the lowering of the weighted sliders to cause the tong points to engage the surfaces of the upper margin of the sheet.

In particular, this embodiment is used when the tongs are to grip the upper edge of a bent glass sheet either to pick up a cold bent glass sheet prior to heating and further processing e.g. toughening, annealing or coating, or to grip the upper edge of a bent glass sheet while it is still hot and is held between the bending dies which have bent the sheet. In this way the tongs are in exact alignment with the curvature of the bent sheet when the tong jaws close to grip the sheet.

In the embodiment of FIGS. 6 to 9 there is illustrated one of the pairs of tongs which are to grip the upper margin of a hot sheet of glass which is held between bending dies following the bending of the sheet to a desired curvature, for example, for the use in the manufacture of a motor vehicle windscreen.

A number of tongs, for example, six tongs, are spaced along a main tong bar 70 and each tong gate comprises a vertical pivot rod 71 which is either bolted directly to the bottom of the tong bar 70 as illustrated in FIG. 7 or is bolted to a cantilever arm fixed to the tong bar 70 and extending horizontally from the tong bar at right angles to the tong bar to bring the tong gate more nearly into a location in which the tong jaws will overlie the upper edge of the glass sheet when it is bent. For example, the tongs for gripping the upper edge of the sheet near the sides of a sheet bent to conform to the desired shape of a motor vehicle windscreen having sharp end curvature, may be cantilevered well out from the tong bar 70.

The pivot rod 71 is threaded at its upper end which is of reduced diameter as indicated at 72, which part 72 of reduced diameter fits through vertically aligned bushes 73 and 74 which are welded to the upper and lower faces of the tong bar 70.

The tong gate which hinges on the vertical pivot rod 71 comprises a vertical plate member 75 which carries hinge plates 76 and 77 on its back face, respectively at the top and near the bottom of the plate.

Bearing sleeves 78 and 79 in the hinge plates pivot the plate member 75 on the pivot rod 71. The bearing sleeve 79 which is fitted in the lower hinge plate 77 has a lower annular flange 80 which bears against a collar 81 which is fitted on the suspension bar 71 below the bearing sleeve 79 thus locating the plate member 75 of the tong gate vertically on the rod 71. The collar 81 is fixed to the rod 71 by a dowel pin 82. A second collar 83 is fixed in position on the lower end of the rod 71, by a screw 84 engaging with an annular groove 85 around the lower end of the pivot rod 71.

A pin 86 extending transversely from the back face of the lower end of the plate member 75 of the tong gate engages with a slot 87 in the collar 83, which slot 87 is of greater arcuate length than the diameter of the pin 86 thus allowing the tong gate to hinge on the suspension member 71 within limits defined by the arcuate length of the slot 87.

A support bar 88 for the upper end of the tongs is welded to and extends transversely from the upper end of the front face of the plate member 75. A support bar 89 for the lower end of the tongs is carried by a support structure including a plate 90 which is fixed to the front face of the plate member 75 of the tong gate by bolts 91 which extend through longitudinal slots 92 in the plate member 75 and are screwed into a backing plate 93 positioned behind the plate member 75.

A bracket 94 is welded to the lower front face of the plate 90 and carries a downwardly extending leg 95, to the lower end of which the lower support bar 89 for the tongs is welded.

The tongs comprise a suspension member which has a tubular upper part 96 which is threaded at its upper end as indicated at 97 and is secured in an aperture in the upper support bar 88 of the tong gate by means of locking nuts 98.

A collar 99 is welded to the lower locking nut 98 and the tubular part 96 extends through a bore 100 in that collar. The bore 100 has a widened lower part 101, and the collar 99 has a lower flat abutment face 102.

Just below the collar 99 the tubular part 96 terminates in a tongue 103 which fits into a fork 104 at the upper end of a short link 105. The tongue 103 is coupled into the fork 104 by a pivot pin 106.

The lower end of the link 105 is formed as a tongue 107 which is at right angles to the tongue 103, and which engages in a fork 108 on the upper end of a bar 109 which constitutes the lower part of the suspension member. The tongue is coupled into the fork by a pivot pin 110 which is at right angles to the pin 106.

The bar 109 is thus linked to the upper part 96 of the suspension by means of a joint permitting swinging of the bar, and of the tongs carried on the bar, in two directions at right angles. Near its lower end the bar 109 passes freely through a slot-shaped aperture 112 in the support bar 89.

The tongs comprise a pair of straight tong arms 6 and 7 which are pivoted together by a pivot pin 8. The tong arm 6 is fitted with an inwardly extending bifurcated hinge bracket 113, FIG. 8, having two parallel arms 114, the tong arm 6 being welded or brazed in a slot in the hinge bracket 113.

The tong arm 7 is similarly welded or brazed in a slot in a bifurcated hinge bracket 115 which has two parallel arms 116, and the ends of the arms 114 extend outside and overlap the ends of the arms 116. The pivot pin 8 passes through an aperture 117 near the lower end of the bar 109 and through apertures in the arms 114 and 116, and is retained in position by means of stainless steel washers 12 and co-operating split pins 13. The pivot pin 8 for the tong arms 6 and 7 is thus stationary in the vertical sense relative to the tong bar 70 and there is no vertical movement of the pivot pin 8 as the tong jaws are opened or closed.

The tong arms 6 and 7 extend below the brackets 113 and 115 to form the jaws 15 and 16 of the tongs which jaws carry axially adjustable tong pins 17 and 18 of heat-resisting steel. The tong pins 17 and 18 are screwed into threaded bushes 118 which are formed at the lower ends of the jaws and the pins are held in position by lock nuts 119.

The depth of penetration of the points of the tong pins 17 and 18 into the surfaces of the glass sheet 1 is determined by the settable stop bolt 19 which is screwed through an aperture in the tong jaw 15. The length of extension of the stop bolt 19 from the tong jaw 15 towards the tong jaw 16 sets the gap between the points of the tong pins 17 and 18 when the tongs are gripping the glass sheet 1.

In this embodiment the tongs are biassed closed by a weighted slider including a sleeve 120 which is slidable on the bar 109. A tubular weight 121 is clamped on the sleeve 120, the parts of the weight being joined by bolts 122 and being located by a dowel 123. The bolts 122 clamp the two parts of the weight to the sleeve.

The bore through the sleeve 120 has a widened upper part 124 which surrounds the articulated link 105 when the sleeve and slider are in their lowermost position to permit movement of the joint about both pivot pins 106 and 110.

Figure 10:
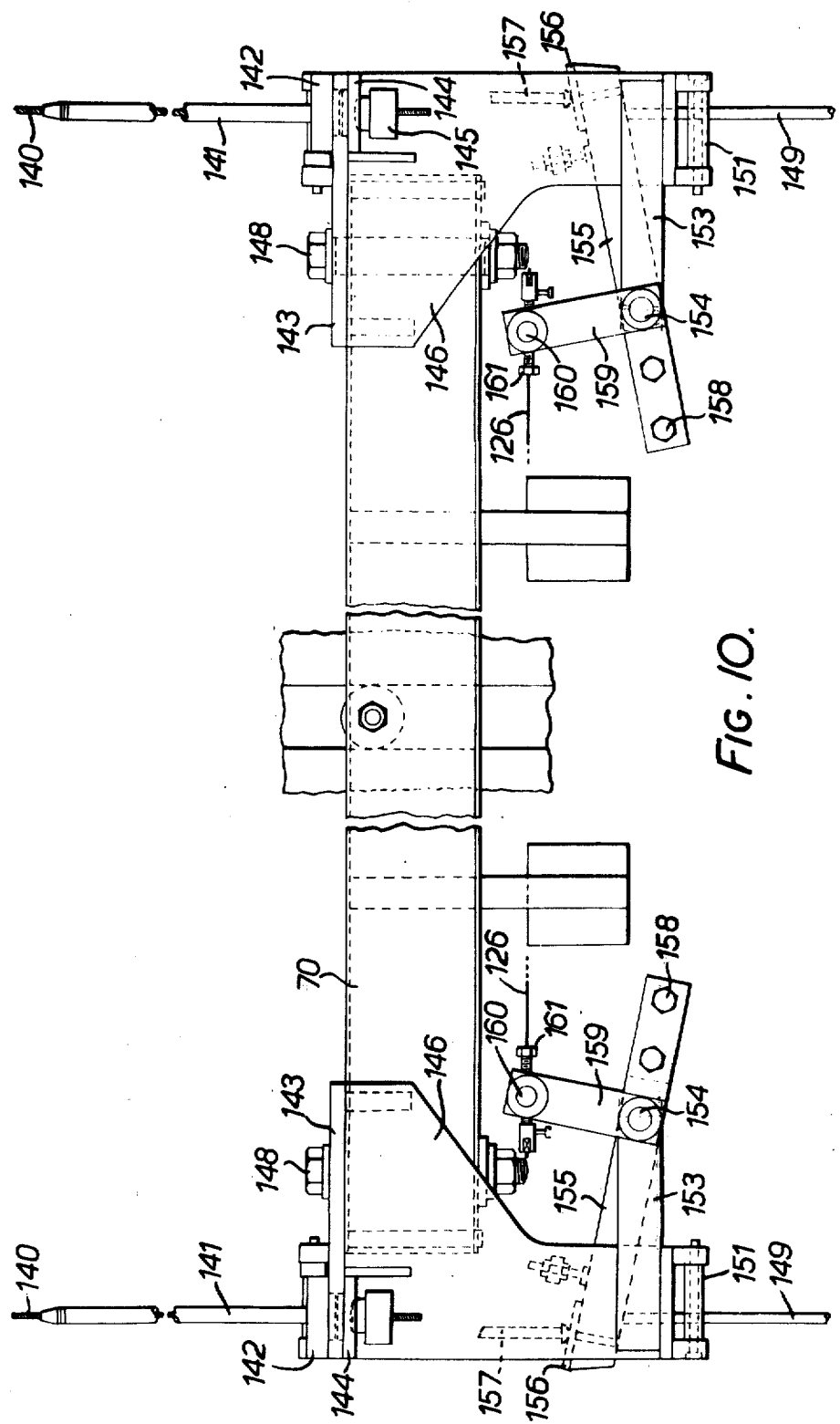
FIG. 10 is a front elevation of the tong bar of FIGS. 6 and 7.
Figure 11:
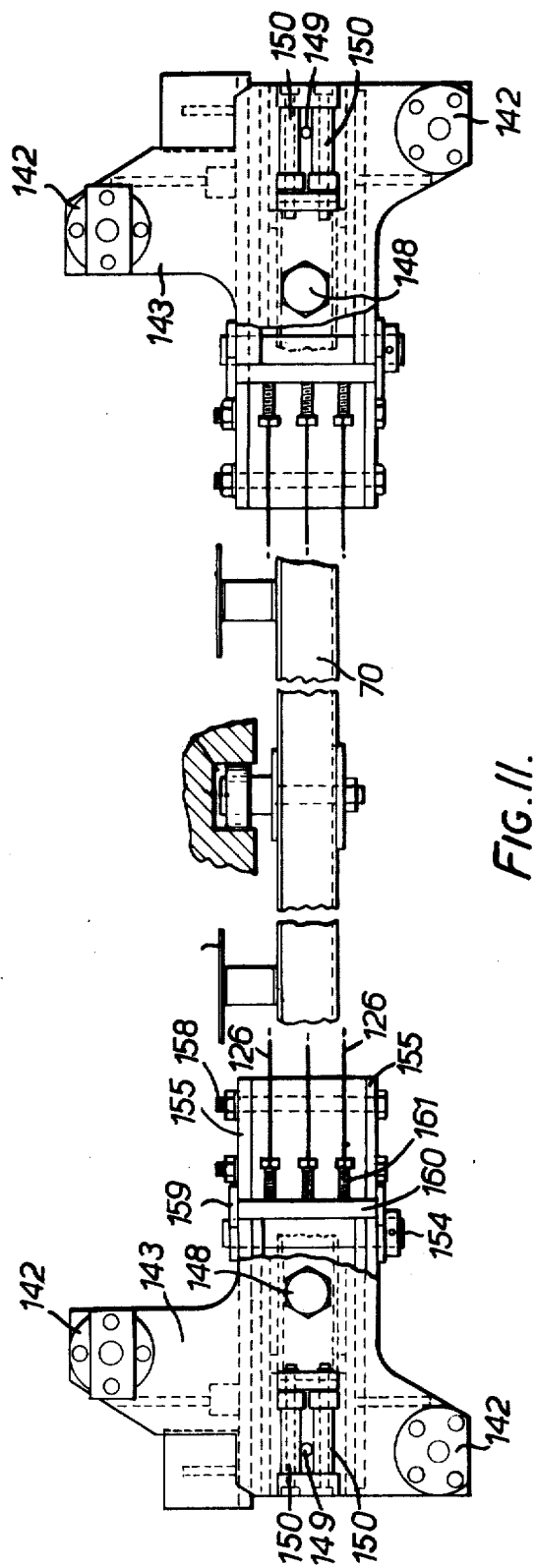
FIG. 11 is a plan view of the tong bar of FIG. 10.
Figure 12:
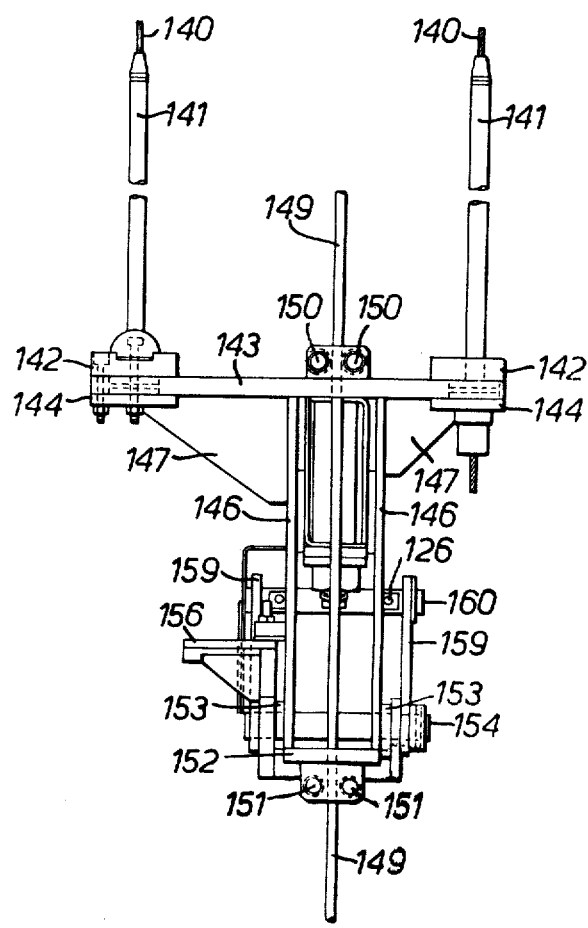
FIG. 12 is an end elevation of the tong bar of FIG. 10.

An inverted U-shaped strap 125 is welded at its lower ends to the outer surface of the tubular weight 121 and a multistrand cable 126 for operating the tongs is attached to the top of the strap. The cable is threaded through a guide tube 127 which is attached to the bottom of the tong bar and is operated by actuating means at one end of the tong bar as shown in FIGS. 10 to 12.

When the tong operating cable is tensioned to open the tong jaws the weight 121 is raised until the upper face 128 of a radial flange 129 on the upper end of the sleeve 120 abuts against the lower face 102 of the fixed collar 99. In this position the sleeve 120 fits closely around the articulated link 105 so that the suspension bar 109 is effectively locked solid with the fixed upper tubular part 96 of the suspension.

The suspension member is thus rigid when the tong jaws are opened and the tongs are being located over the upper edge of a glass sheet, but are free to move relative to their fixed suspension when the tong jaws are closed on to the sheet, while the spacing of the pivot 8 of the tongs from the fixed suspension does not vary.

The upper end of the tong arm 6 is freely pivoted to a bifurcated tong link 130 which is formed with two parallel arms 131 which extend inwardly. A pivot pin 32 extends through the tong link 130 and the upper end of the tong arm 6 is freely pivoted on the pin 32 which is retained in position by means of stainless steel washers 132 with co-operating split pins.

At its upper end the tong arm 7 is freely pivoted on a pivot pin 22 between two spacer washers 23. Also freely pivoted on the ends of the pivot pin 22 on either side of the washers 23 are two tong links 24. The assembly of the tong arm 7, the spacer washers 23 and tong links 24 is held together by stainless steel washers 133 on the ends of the pivot pin 22 with co-operating split pins which pass through holes at the ends of the pivot pin. The tong links 24 are bent outwardly and fit over the ends of the parallel arms 131 of the tong link 130. Pivot pins 134 are fixed to the lower ends of straps 135 which are welded to the outer surface of the weight 121, which pins 134 fit through holes in the ends of the arms 131 and through aligned holes in the ends of the tong links 24. The inner ends of the pivot pins 134 extend into vertical slots 136 formed in the lower end of the sleeve 120.

The tong bar 70 is illustrated in detail in FIGS. 10 to 12 and is a straight bar which is suspended from two overhead hoists by means of lifting cables 140 as described in co-pending application Ser. No. 450,459 for "Bending Glass Sheets" filed concurrently herewith, now U.S. Pat. No. 3,880,635, the disclosure of which is hereby incorporated by reference.

There are two lifting cables 140 fixed to each end of the tong bar and these cables are fitted with sleeves 141 and the tong bar 70 is fixed to the lower ends of the sleeves 141. The lower end of the cable sleeves are welded to upper adaptor plates 142 which rest on the upper face of a plate 143 of the tong bar. The ends of the cables 140 which project from the lower ends of the cable sleeves 141 pass through the plates 143 and through lower adaptor plates 144 below the plate 143. Ferrules 145 are welded to the lower ends of the cables beneath the adaptor plates.

In the embodiment described in the above mentioned application Ser. No. 450,459 the cables at one side of the tong bar may be fixed while the cables at the other side of the tong bar are held in position by adjustable cable clamps. This permits exact adjustment of the tong bar when the hoist mechanism is being set up.

The tong bar 70 is of rectangular cross-section as shown in FIGS. 10 to 12 and the plates 143 are fixed to both ends of the bar. Each of the plates 143 is part of a bracket which also includes two side plates 146 which are welded to the top plate 143 being attached thereto by strengthening fins 147. The side plates 146 extend well below the tong bar 70 and the bracket is attached to the tong bar by a bolt 148 which extends vertically through the end of the tong bar and through the top plate 143.

FIGS. 11 and 12 show that each top plate 143 has side extensions for fixing the adaptors 142, 144 which attach the ends of the hoist cables 140 to the plates 143.

The tong bar is steadied and guided during upward and downward movement by means of two guide wires 149. The upper end of each of the guide wires 149 is held in a clamp attached to the fixed overhead structure and the guide wires 149 extend vertically below the lowermost point of travel of a glass sheet suspended from the tongs. The lower end of each guide wire 149 passes beneath a guide pulley, not shown, which terminates in a shackle which is attached to the shaft of an hydraulic cylinder by means of which the wire 149 is maintained at a required tension.

Attached to each of the top plates 143 at the ends of the tong bar there is a pair of rollers 150 extending parallel to the tong bar. The guide wires 149 pass between these rollers 150. Similar pairs of rollers 151 running on the guide wires 149 are mounted on a cross plate 152 which is welded between the bottom ends of the two side plates 146 of the bracket.

At both ends of the tong bar there are welded to the side plates 146 near their lower end, side extension plates 153 which extend inwardly of the tong bar and carry a pivot pin 154 on which is pivoted a frame comprising two side arms 155 which are pivoted on the ends of the pin 154 which project through the outside faces of the ends of the extension plates 153. One of the side arms 155 has a rearward extension which is fitted with a striker plate 156 to be engaged by a pusher rod indicated at 157 for rocking the frame.

The arms 155 are connected together at their outer ends by bolts 158 and fixed to each of the arms and extending in right angles thereto in the region of the pivot pin 154 are upstanding plates 159 the upper ends of which are connected by a rod 160 in which there engage screw clamps 161 in which there are clamped the outer ends of three tong operating cables 126 which open three of the tongs. When there are six tongs spaced apart along the tong bar 70 the tong operating cables 126 for three of the tongs lead to tong actuating means as just described at one end of the tong bar and the tong operating cables 126 for the other three of the tongs lead to identical tong actuating means at the other end of the tong bar. The tong jaws close under the weight of the weighted sliders forming part of the tong construction and tensioning of the actuator cables when the striker plates 156 are engaged and pushed downwardly by the pusher rods 157, causes the arms 155 to rotate, simultaneously opens the jaws of all the tongs.

When the tong bar 70 is raised and the glass sheet 1 is supported in an upright position, for example held between male and female bending dies which are closed on to a bent glass sheet, the tongs are opened by tensioning the tong operating cables 126 to raise the weight 121 and sleeve 120 of each tong on the bar 109 of the suspension member and thereby raise the tong link pivot pins 134 causing the tong jaws 15 and 16 to open and locking the bar 109 to the member 96.

The tong bar 70 is then lowered by lowering the cables 140 until the tongs are in position with the jaws 15 and 16 astride the upper edge of the glass sheet 1 and the cables 126 are released which allows the weighted sliders to drop. In each of the tongs this pushes the tong link pivot pins 134 downwardly so that the tong jaws 15 and 16 close pressing the points of the tong pins 17 and 18 against the surfaces of the glass sheet. When the bending dies are withdrawn the glass sheet is suspended from the tongs.

The articulated joint constituted by the link 105 and its two pivots at right angles then permits small swinging movements of the tongs in two directions at right angles, limited by the dimensions of the slot 112 so that the tong points can swing somewhat relative to the fixed upper parts of the tong suspension to accommodate expansions and contractions of the suspended glass sheet during further processing, for example reheating and quenching by chilling air or by immersion in a chilling liquid.

Tong guide means may be provided for guiding the tongs into an exact position with the jaws straddling the upper edge of the glass sheet and so that the pivots 8 of each of the tongs rise exactly vertically above the upper edge of the glass sheet. This is especially advantageous when the tongs are being lowered to grip the upper edge of a glass sheet which has just been bent between bending dies, and FIG. 6 shows tong guide means for guiding the tongs into exact location. This guiding is effected by pivoting of each tong gate about its pivot rod 71. The lower support bar 89 of each tong gate has an outward extension 165 in which are fitted two oppositely extending pusher members 166 and 167 which are screwed into holes in the extension 165 of the bar 89 and are fitted with lock nuts. The pusher members have domed heads 168 and 169 for engagement with guide surfaces of the tong guide means which will now be described.

A bar 170 is mounted on the upper edge of a base frame of a female ring frame bending die, not shown, by legs 171 which are welded to the upper edge of the base frame and to the bar 170.

A tong guide block 172 for engagement by the domed head 168 of the pusher member 166 is mounted on a backing support block 173 which is welded to the lower end of a plate 174 which is vertically mounted on a cylindrical housing indicated generally at 175, and which plate 174 is located by means of a locating pin 176 which extends perpendicularly from a side flange 177 of an intermediate support bracket 178 in which the cylindrical housing 175 is also fixed. The intermediate support bracket 178 is welded on to a main support bracket 179 which is welded on to the bar 170.

The tong guide block 172 has an inwardly and downwardly inclined face 180 which leads in to a lower vertical face 181. As the tong bar 70 is lowered the domed head 168 of the pusher member 166 first engages the face 180 and the tong gate rotates as lowering continues until the domed head 168 runs on to face 181 so as to swing the tongs into approximate alignment above the upper edge of the glass sheet.

A similar tong guide block 182 having an upper inclined surface 183 and a lower vertical surface 184 is similarly mounted on a bracket plate 185 which is welded to a rear support frame of a male bending die, not shown. The tong guide block 182 is lower than the block 172 and the domed head 169 of the pusher member 167 cannot engage the sloping face 183 until alignment of the tongs by engagement of the head 168 on the surface 180 has already begun. By the time the head 169 is running on to the vertical surface 184 of the block 182 the head 168 is already free from the block 172 so that the pusher members cannot jam between the guide blocks and the location of the head 169 on the surface 184 corrects any remaining degree of misalignment and brings the pivot 8 exactly over the upper edge of the glass sheet.

A pair of tong guide means of this kind is provided for each pair of tongs so that in the embodiment where there are six pairs of tongs suspended from the tong bar 70 there are also six tong guide blocks 172 mounted above the upper edge of the female die and six oppositely disposed tong guide blocks 182 similarly mounted above the upper edge of the male die.

The tongs may then suspend the glass sheet, when the bending dies have been opened, as the sheet is lowered through further operations such as boost heating prior to a preliminary cooling followed by quenching in a tank of chilling liquid, for example a mineral oil, all of which operations are effected on the bent glass sheet upon downward movement of the tong bar 70 through successive stations of a treatment plant.

Further the tongs may be used to grip and suspend a glass sheet as it is conveyed through operations such as heating, or heating and bending, followed by subsequent quenching operations. When treatment is completed the lower edge of the glass sheet is supported and the tongs are released by pressing down the striker plates 156 and thereby tensioning the tong operating cables 126.

The tongs of FIGS. 6 to 9 may be aligned in the same vertical plane so as to grip the upper edge of a cold flat glass sheet which is suspended by the tongs as it moves through a heating furnace prior to toughening, or bending and toughening. When bending is taking place tong guide means engaging the pusher members 166 and 167 can advantageously be used to cause the tong gates to pivot in order that the tongs shall follow the bending of the sheet with the pivots 8 of the tongs maintained approximately aligned above the upper edge of the glass sheet throughout the bending operation.

Means other than the weighted slider may be employed for biassing the tongs to close the tong jaws. For example an electro-magnetic actuating system or a pneumatic bellows actuating system may be employed for sliding the sleeve 120 on the bar 109 of the suspension member.

Another embodiment of the invention is illustrated in FIGS. 13 to 17 which show a modified form of the tongs of FIGS. 6 to 9 and show tong operating means in the form of straight rods replacing the tong operating cables 126.

Figure 13:
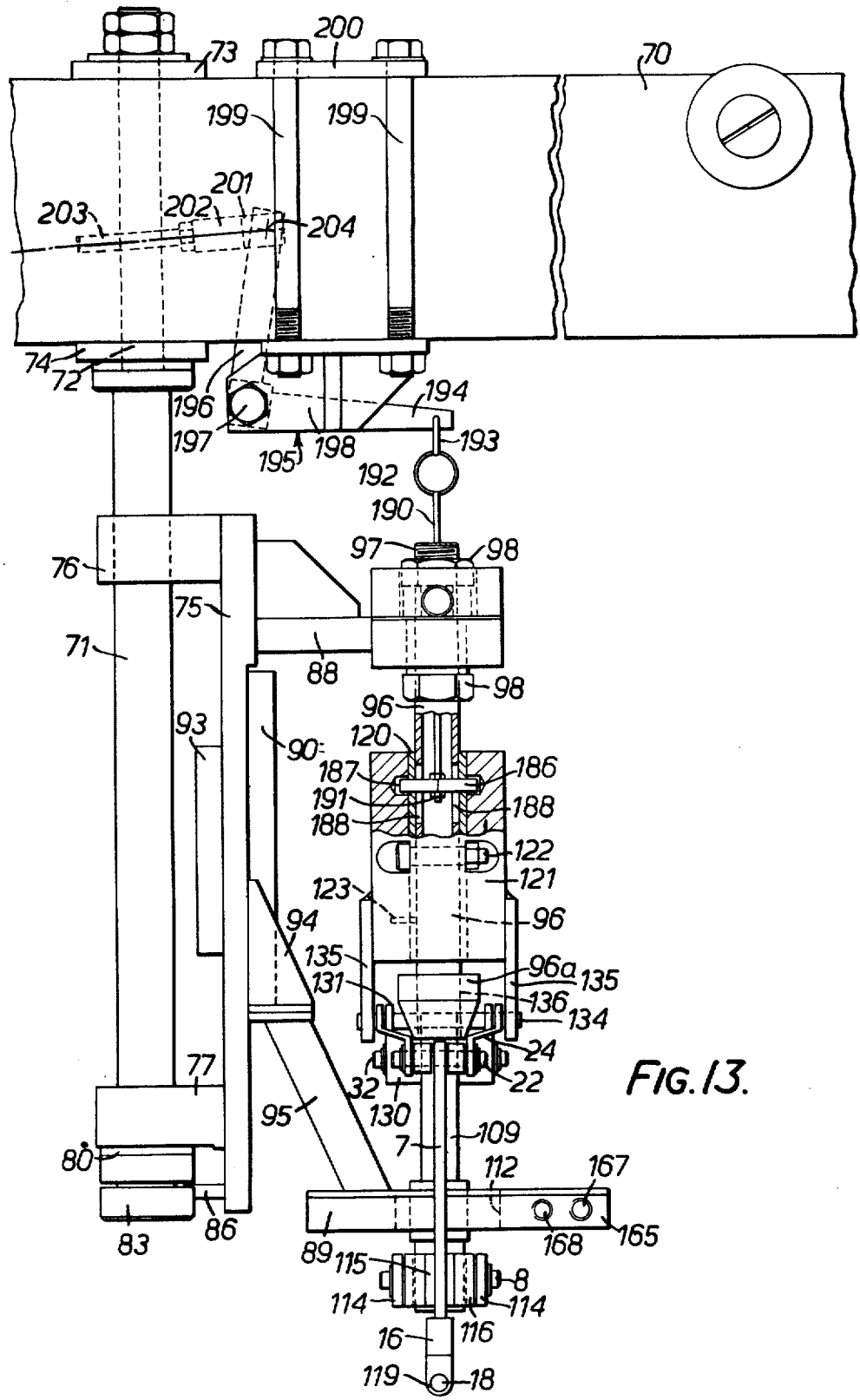
FIG. 13 is a side elevation of a modified form of the tongs of FIGS. 6 to 9 showing tong operating means mounted on the tong bar.
Figure 14:
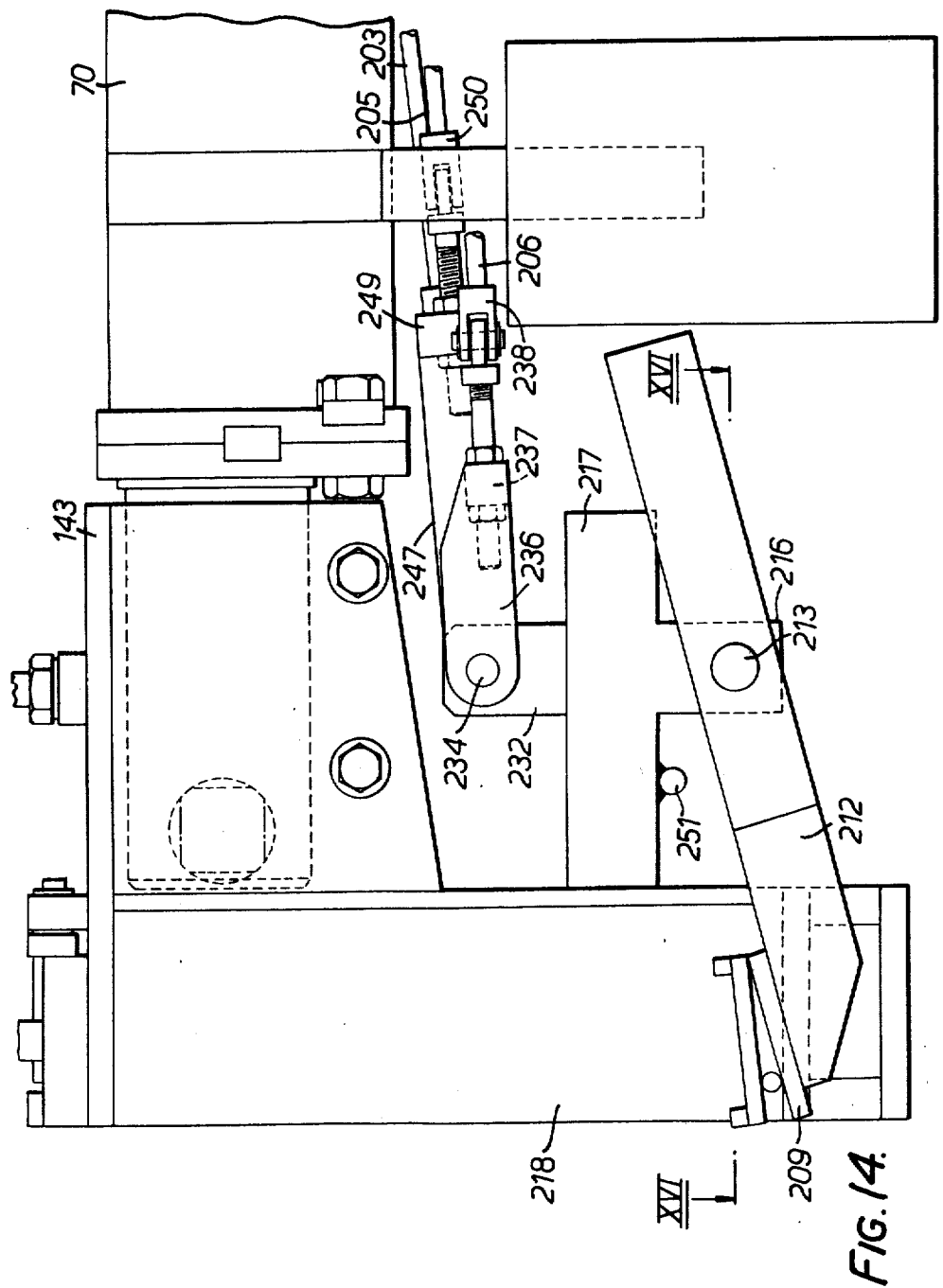
FIG. 14 is a front elevation of one end of the tong bar showing actuating means for the tong operating means of FIG. 13.
Figure 15:
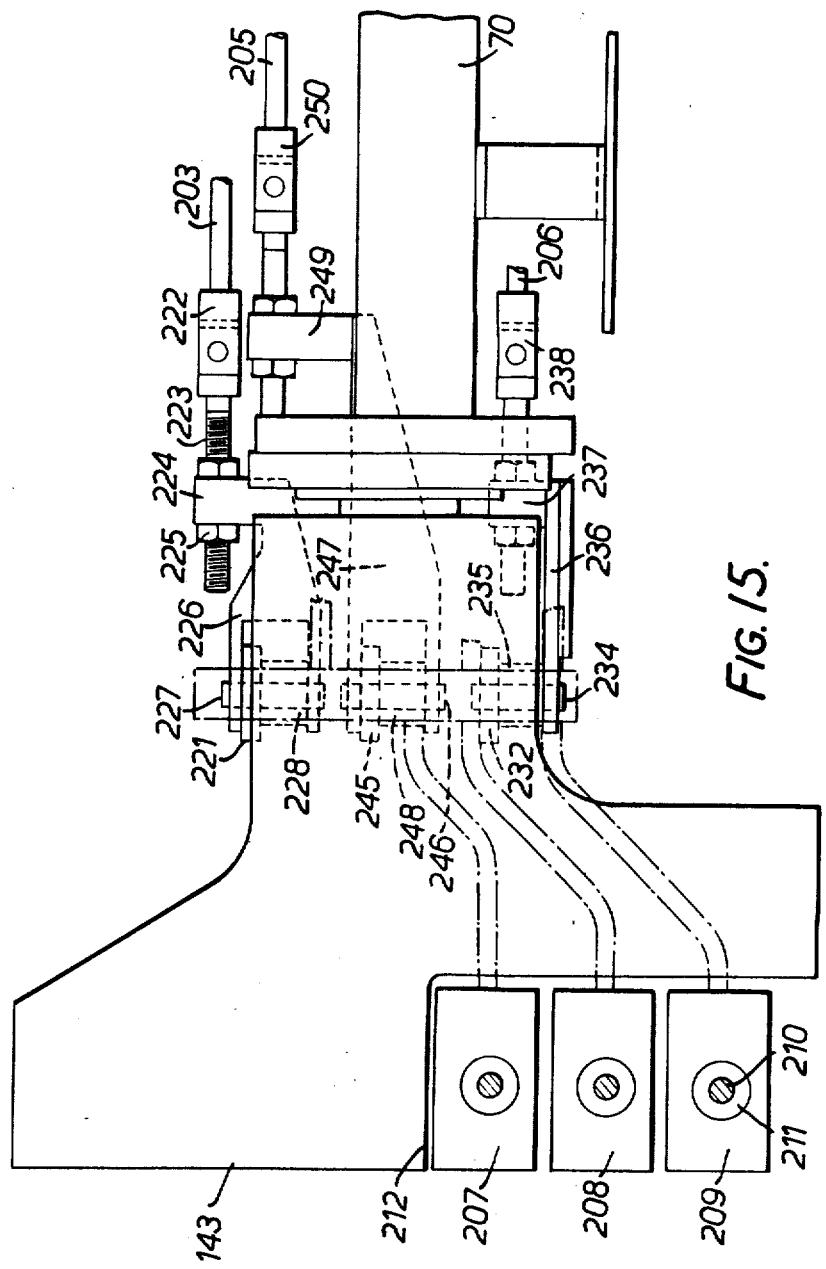
FIG. 15 is a plan view of the end of the tong bar illustrated in FIG. 14.

The modified tongs illustrated in FIG. 13 are similar in construction to the tongs of FIGS. 6 to 9 but are simpler in that the articulation of the suspending member is omitted. The tongs are suspended in a tong gate of the same kind as described with reference to FIGS. 6 and 7. The suspension member of the tongs has a tubular upper part 96 which is formed with a screw thread on its upper end as indicated at 97 and is secured to the upper support bar 88 of the tong gate by a mounting including a horizontal bearing member of cylindrical form which permits a small degree of swinging movement of the tongs relative to the support bar 88.

At its lower end the tubular part 96 of the suspension member fits into a coupling member 96a. The lower part of the suspension member is a solid bar 109 of circular cross-section which is fitted into and depends from the coupling member 96a. The bar 109 has a part of enlarged diameter near its lower end which fits through the aperture 112 in the lower support bar 89 of the tong gate.

The tongs comprise a pair of straight tong arms 6 and 7 pivoted together by a pivot pin 8 and extended beyond the pivot as tong jaws 15 and 16 which carry adjustable tong pins 17 and 18. A settable bolt, not shown, is provided to determine the depth of penetration of the points of the tong pins into the surfaces of the glass sheet.

The tong links 24 and 131 are the same as in the embodiment of FIGS. 6 to 9 and the pivot pins 134 coupling those links extend into longitudinal slots 136 in the coupling member 96a.

In this embodiment the weighted slider includes a sleeve 120 which is slideable on the tubular part 96 of the suspension member. A tubular weight 121 is clamped on to the sleeve 120. The weight 121 is formed in two parts which are joined by bolts 122 and the weight 121 is located by dowels 123.

A dowel pin 186 is fixed transversely into diametrically opposed apertures 187 in the two parts of the weight 121 and passes through apertures in the sleeve 120 and through diametrically opposed longitudinal slots 188 formed in the wall of the tubular part 96 of the suspension member.

A lifting wire 190 is clamped at its lower end to the pin 186 by clamping means 191. The lower end of the wire passes through a hole in the pin 186 and the wire extends upwardly through the tubular part of the suspension member and terminates at its upper end in a ring 192 which is suspended from a link 193 which is itself fitted through a hole near the end of a generally horizontal arm 194 of a bell crank 195 which also has an upright arm 196.

The generally horizontal arm 194 of the bell crank lies underneath the tong bar and is fixed to one end of a shaft 197 which is carried by a bracket 198 which is strapped beneath the lower face of the tong bar 70 by bolts 199 and a clamping plate 200 which bears on the top of the tong bar 70.

The shaft 197 extends transversely beneath the tong bar and beyond the far side of the tong bar as viewed in FIG. 13. The upright arm 196 of the bell crank 195 is fixed to the other end of the shaft 197 and extends upwardly alongside the far side of the tong bar 70.

A slot, not shown, is formed in the upper end of the upright arm 196 and the flattened end of an adaptor 202 fitted to the end of a straight tong actuating rod 203, fits into the slot in the end of the arm 196 and is pivotally held therein by a pivot pin 204.

The tong operating rod 203 extends along the far side of the tong bar 70 to tong actuating means at one end of the tong bar which is illustrated in detail in FIGS. 14 to 17.

The tong actuating means is arranged to pull the rod 203 towards the end of the tong bar and thereby rotates the bell crank 195 to raise the end of the generally horizontal arm 194 of the bell crank and thereby, through the agency of the wires 190 and the transverse pin 186, to lift the weighted slider 121 upwardly and open the tong jaws.

In the embodiment of FIGS. 13 to 17 there are six tongs of the kind illustrated in FIG. 13, spaced apart along the tong bar, and tong operating rods for three of the tongs lead to three individual tong actuating means at one end of the tong bar. The tongs of FIG. 13, operated by a rod 203, are most central of the three tongs operated from the end of the tong bar of FIGS. 14 to 17. The next tongs nearer to the end of the tong bar are operated by an operating rod 205 which runs alongside the tong bar. The tongs nearest to the end of the tong bar are operated by a similar operating rod 206 mounted so as to extend beneath the tong bar.

For actuating each of the tong operating rods 203, 205 and 206 an individual tong actuating means is provided which includes three striker plates 207, 208 and 209 which are mounted side by side in a recess at the end of the tong bar below the level of the tong bar. Each of the striker plates is operated individually by hydraulic cylinders, not shown, which are mounted on the end of the tong bar and each of which includes, connected to its piston, a downwardly directed pusher rod 210 which has a domed head 211 which engages with the appropriate striker plate.

Figure 16:
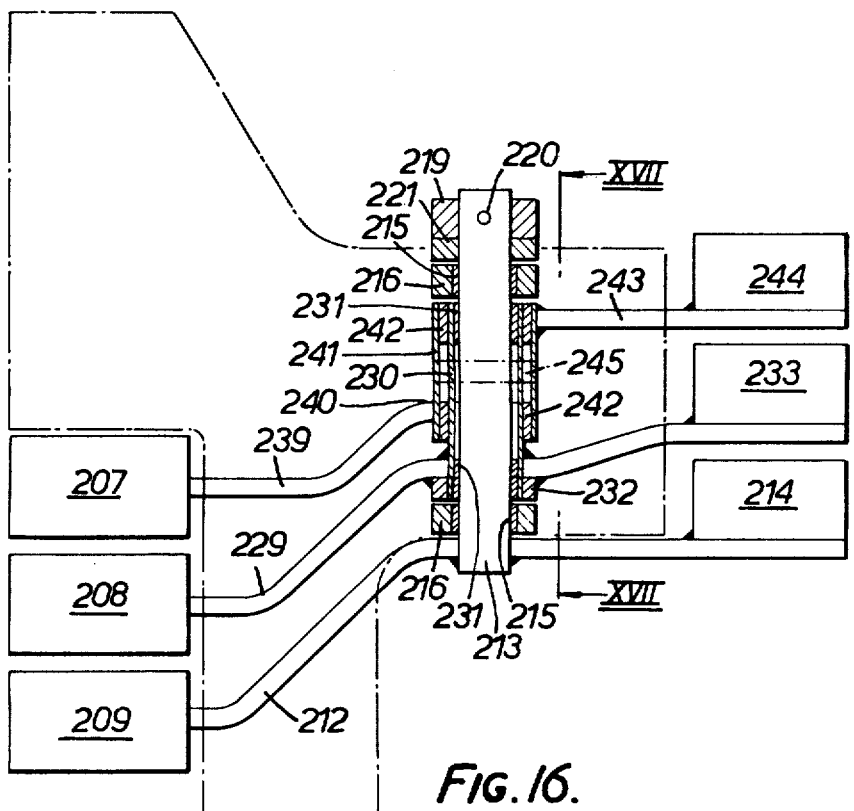
FIG. 16 is a section on line XVI—XVI of FIG. 14.
Figure 17:
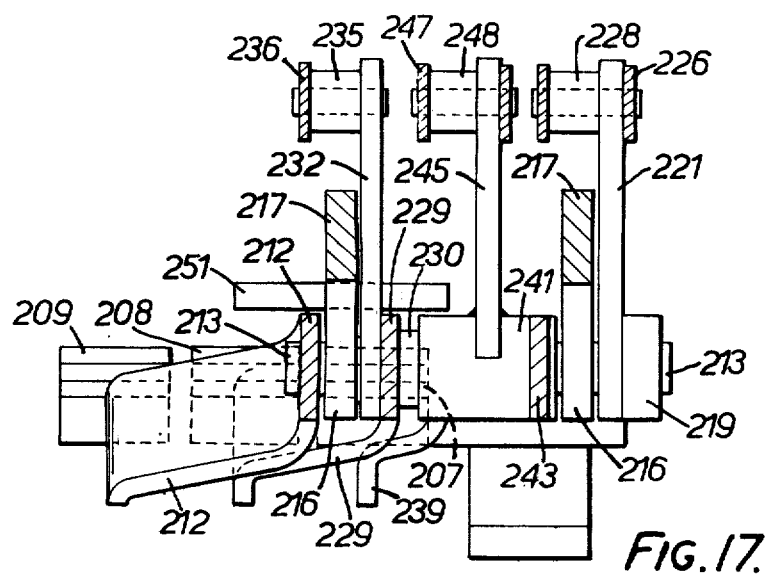
FIG. 17 is a section on line XVII—XVII of FIG. 16.

The striker plate 209 is for operating the actuating rod 203 and is mounted on one end of a curved lever 212 which as shown more clearly in FIGS. 16 and 17 is fixed to a central horizontal shaft 213 and extends beyond that shaft and carries at its other end a counterweight 214. The shaft 213 is rotatable in bearings 215 which are mounted in the downwardly depending legs 216 of two T-shaped brackets 217 fixed to the end structure 218 of the tong bar.

The end of the shaft 213 opposite the end to which the lever 212 is fixed, has an end bush 219 fitted to it and pinned in position by a pin 220. The lower end of an upwardly extending lever arm 221 is welded to the end bush 219. The upper end of the lever arm 221 is coupled to the tong actuating rod 203 which rod is fixed to one side of a universal coupling 222, the other side of which is carried on a screw threaded rod 223 which passes through a hole in a right angle flange 224 and is locked to that flange by locking nuts 225. The flange 224 is formed on the end of a fork member 226 which is coupled to the upper end of the lever arm 221 by a pivot pin 227. A spacer sleeve 228 is fitted on the pin 227 between the arms of the fork member 226.

The middle striker plate 208 is for actuating the rod 206 and is fixed to one end of a curved lever arm 229 which is welded to one end of a sleeve 230 which is fitted over the shaft 213 and is rotatable on that shaft, there being end bearings 231 between the sleeve 230 and the shaft 213. The lower end of an upright lever arm 232 is welded to the same end of the sleeve 220 as is welded to the lever 229. The other end of the lever 229 carries a counterweight 233. The upper end of the lever arm 232 is coupled by a pivot pin 234 on which a spacer sleeve 235 is fitted, to one end of a straight arm 236, the other end of which is formed with a right angle flange 237 to which there is coupled a universal coupling 238 which connects the flange 237 to the tong operating rod 206. The coupling 238 is fixed to the flange 237 in the same way as the coupling 222 for the rod 203 is fixed to the flange 224.

The striker plate 207 for operating the tong actuating rod 205 is mounted on one end of a curved lever arm 239 which is welded at 240 to a sleeve 241 which is fitted over the sleeve 230 and is rotatably mounted on that sleeve by bearings 242. The lever 239 is welded to the sleeve at 240 near one end of the sleeve and at the other end of the sleeve and on the diametrically opposite side of the sleeve there is welded a straight arm 243 which carries a counterweight 244 and acts in effect as a continuation of the lever arm 239 to which the striker plate 207 is attached. The lower end of an upright lever arm 245 is fixed to the sleeve 241 in the manner illustrated in FIG. 17 and the upper end of the arm 245 is coupled by a pivot pin 246 to the arms of a fork member 247. A spacer sleeve 248 is fitted on the pivot pin 246 between the arms of the fork. The other end of the fork member 247 is formed with a right angle flange 249 to which there is fixed a universal coupling 250 which is connected to the tong operating rod 205.

The counterweights 214, 233 and 244 normally maintain the striker plates 209, 208 and 207 in an upper position determined by the lever arms 212, 229 and 239 bearing upwardly against a stop member 251 which is fixed beneath the brackets 217. The pusher rods 210 serve to depress the striker plates downwardly from this position against the effect of the counterweights and when the pusher rods are withdrawn upwardly the counterweights return the striker plates to their upper position and at the same time permit the weighted sliders on each of the tongs to fall to its lowermost position closing the tong jaws.

Similar tong operating rods are provided for the other three tongs on the other part of the tong bar and lead to three similar individual tong actuating means at the other end of the tong bar.

A feature of each of the embodiments illustrated is the pivoting of the tong arms about pivot means which is stationary with respect to the elongate suspension means which co-operate with means operable to fix the suspension means at its upper end to the tong bar. Tong control means is movable with respect to the suspension means in each embodiment of the tongs, for pivoting the tong arms about the stationary pivot to move the tong jaws between open and closed positions.

Figure 2:
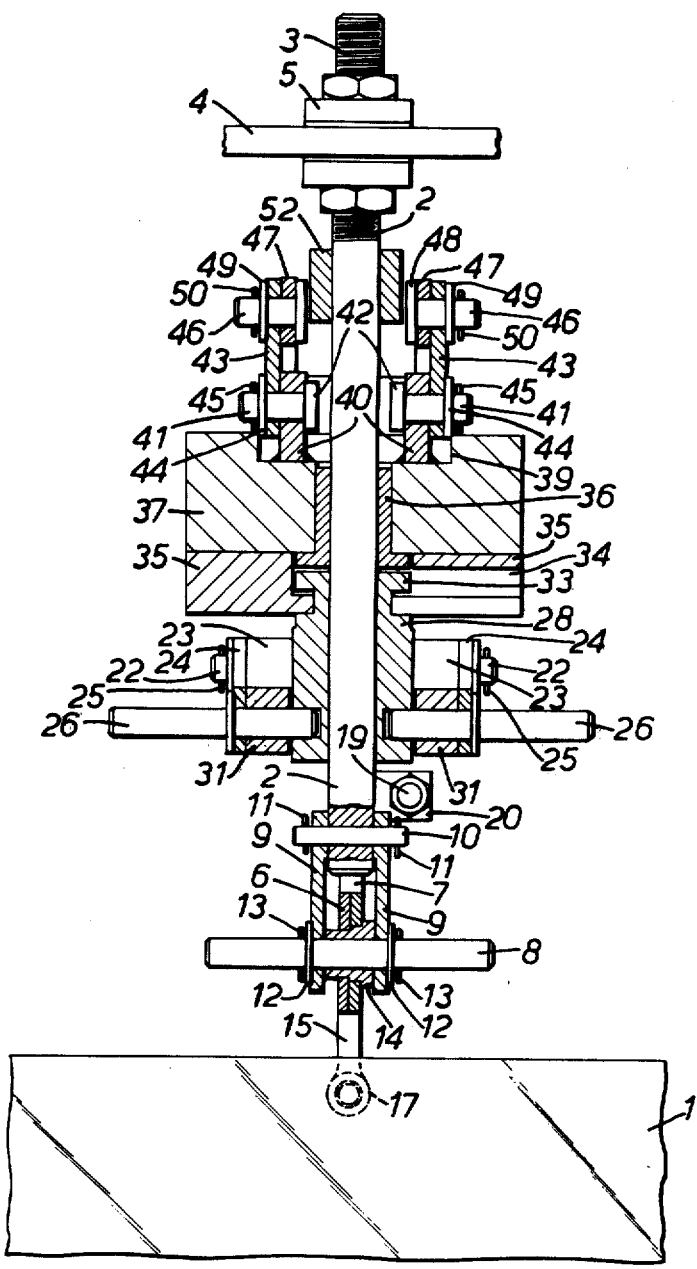
FIG. 2 is a view, partly in section, of line II—II of FIG. 1.
Figure 3:
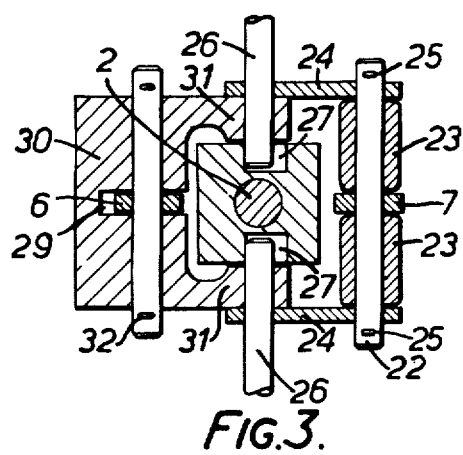
FIG. 3 is a section on line III—III of FIG. 1.
Figure 4:
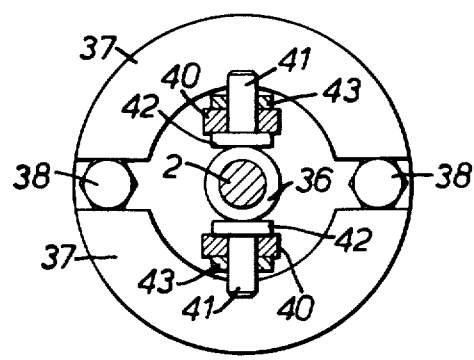
FIG. 4 is a section on line IV—IV of FIG. 1.

The tong control means in each embodiment further includes biassing means in the form of a weighted slider operable independently of the position of the glass to be gripped, to bias the tong jaws towards the glass-gripping closed position. The weighted slider biassing means is further effective in each embodiment to return the tong actuating means to its rest position, that is the weighted slider 37 in FIGS. 1 and 2 is operable to return the rocking frame through which the tongs are actuated, to its rest position with the outer sleeve 59 in position for engagement by a downwardly movable tong actuating member 60.

Further in the embodiment of FIGS. 6 to 9 the weighted slider 121 is effective to tension the flexible cable 126 in such a way as to return the striker plate at each end of the tong bar to its rest position as illustrated in FIG. 10.

Similarly the biassing action of the weighted slider 121 in each of the tongs illustrated in FIG. 13 is effective, with the effect of the counterweights on the ends of the lever arms as illustrated in FIG. 16, to return the individual striker plates 207, 208 and 209 to their upper rest positions.

Further each embodiment illustrates a main feature of the invention whereby the tongs can pick up a glass sheet at a location which is at a fixed spacing from the tong suspension level, because the pivot of the tong arms of each of the tongs is at a fixed distance from the suspension means by which the tongs are fixed to the tong bar.

I claim:

1. Tongs for suspending glass, comprising an elongated suspension member adapted for fixing at its upper end to a tong bar, a pair of tong arms pivoted about a pivot on the suspension member at a fixed distance from its upper end, which tong arms extend beyond the pivot to form jaws of the tongs, tong links pivotally connected to the tong arms and pivotally connected to a weighted slider which, in use of the tongs, is slidable vertically on the suspension member, which tong links are arranged to close the jaws in the lowermost rest position of said weighted slider under gravity, and lifting means attached to the weighted slider and operable to raise the slider on the suspension member and thereby, through the action of the tong links, open the tong jaws about the pivot on the suspension member.

2. Tongs according to claim 1, wherein the tong arms are straight bars and have inward extensions connected to the pivot on the suspension member, and the tong links are pivotally connected to the upper ends of the tong arms and converge upwardly to the pivotal connection of the tong links to the weighted slider.

3. Tongs according to claim 2, wherein the inward extensions of the tong arms are hinge brackets fixed on the tong arms.

4. Tongs according to claim 2, wherein the tong links are pivotally connected to the lower end of the weighted slider.

5. Tongs according to claim 4, wherein the tong links are pivotally connected to two diametrically opposed pivot pins which engage in open-bottomed, vertical slots formed in the lower end of the slider.

6. Tongs according to claim 1, including a settable stop member extending from one of the tong arms towards the other arm to set the gap between the tong jaws when closed.

7. Tongs according to claim 1, in combination with a tong gate in which the tongs are suspended, which tong gate includes a pivot one side of which is for fixing to a tong bar, the tongs being suspended from an upper support member connected to the other side of said tong gate pivot.

8. Tongs according to claim 1, in combination with a tong bar from which the tongs are suspended, and tong operating means connected to said lifting means and leading along the tong bar to tong actuating means positioned at an end of the tong bar.

9. The combination according to claim 8, wherein said tong operating means is a metal cable attached to said lifting means.

10. The combination according to claim 8, wherein said tong operating means includes a tong operating rod extending along the tong bar.

11. The combination according to claim 8, wherein said tong operating means includes a bell crank mounted on the tong bar and having an arm connected to said lifting means and another arm connected by an operating rod to the tong actuating means.

12. Apparatus according to claim 8, comprising six tongs spaced apart along the tong bar, and wherein tong operating cables for three of the tongs lead to tong actuating means at one end of the tong bar, and tong operating cables for the other three of the tongs lead to tong actuating means at the other end of the tong bar.

13. Tongs for suspending glass, comprising an elongated suspension member adapted for fixing at its upper end to a tong bar, a pair of tong arms pivoted about a pivot on the suspension member at a fixed distance from its upper end, which tong arms extend beyond the pivot to form jaws of the tongs, tong links pivotally connected to the tong arms and pivotally connected to a weighted slider which comprises a sleeve which is slidable on the suspension member and a tubular weight surrounding the sleeve and attached thereto, the tong links being arranged to close the jaws in the rest position of said weighted slider, and lifting means attached to the slider and operable to raise the slider and open the tong jaws about the pivot on the suspension member, said lifting means comprising a U-shaped strap fitted downwardly over the suspension member and secured at its ends to the slider, and a metal actuating cable attached to the top of the strap.

14. Tongs according to claim 13, wherein the suspension member is formed in two parts which are articulated together at a location such that the articulation is free when the weighted slider is in its rest position and the articulation is lockable by the sleeve which slides up over the articulation when the strap is raised to open the tong jaws.

15. Tongs according to claim 14, wherein the articulation comprises a short link pivotally jointed at both ends to the two parts of the suspension member by pivots whose axes are at right angles to each other.

16. Tongs for suspending glass, comprising an elongated suspension member adapted for fixing at its upper end to a tong bar, a pair of tong arms pivoted about a pivot on the suspension member at a fixed distance from its upper end, which tong arms extend beyond the pivot to form jaws of the tongs, tong links pivotally connected to the tong arms and pivotally connected to a weighted slider which is slidable on the suspension member, said tong links being arranged to close the jaws in the rest position of said weighted slider, and lifting means attached to the slider and operable to raise the slider and open the tong jaws about the pivot on the suspension member, wherein the suspension member is a straight bar and the slider includes a sleeve on which the tong links are pivoted and at least one weight slidable on the suspension bar and supported on the sleeve.

17. Tongs according to claim 16, wherein the tong arms cross at their pivot on the suspension bar, and the tong links are connected to the upper ends of the tong arms and converge downwardly to the pivot on the slider.

18. Tongs according to claim 16, wherein one said weight is fixed to the sleeve and is hung by straps from pivot pins on one side of a rocking frame which is mounted on an off-set pivot pin fixed in a collar which is fixed on the suspension bar, whereby the other side of the rocking frame is normally rocked upwardly under the action of the weighted slider, and the depression of said other side of the rocking frame opens the tong jaws.

19. Tongs according to claim 16, wherein the tong links are pivoted on the sleeve by pivot pins which extend outwardly for engagement by means operable to lift the sleeve and thereby open the jaws.

20. Tongs according to claim 16, wherein the pivot for the tong arms and the pivots for the tong links comprise pivot pins located in transverse slots in said members to permit limited transverse movement of the pivot pins.

21. Tongs according to claim 16, wherein the pivot pin for the tong arms is extended outwardly to cooperate with locating means for positioning the tongs.

22. Tongs for suspending glass, comprising an elongated suspension member adapted for fixing at its upper end to a tong bar, a pair of tong arms pivoted about a pivot on the suspension member at a fixed distance from its upper end, which tong arms extend beyond the pivot to form jaws of the tongs, tong links pivotally connected to the tong arms and pivotally connected to a biassed member, which tong links are arranged to close the jaws in the rest position of said biassed member, in combination with a tong gate in which the tongs are suspended, which tong gate includes a pivot one side of which is for fixing to a tong bar, the tongs being suspended from an upper support member connected to the other side of said tong gate pivot, and wherein the tong gate pivot includes a pivot rod the upper end of which is for fixing to the tong bar with the rod depending from the tong bar, and the upper support member is fixed to a plate which hinges on the pivot rod and which carries lower support means for locating the lower end of the tongs.

23. Tongs according to claim 22, including pusher means on said lower support means for engagement by tong guiding means to swing the tong gate to a predetermined angular position as the tong bar is lowered.

24. Tongs for suspending glass, comprising an elongated suspension member adapted for fixing at its upper end to a tong bar, a pair of tong arms pivoted about a pivot on the suspension member at a fixed distance from its upper end, which tong arms extend beyond the pivot to form jaws of the tongs, tong links pivotally connected to the tong arms and pivotally connected to a weighted slider which is slidable on the suspension member, which tong links are arranged to close the jaws in the rest position of the weighted slider, and lifting means attached to the slider and operable to raise the slider and open the tong jaws about the pivot on the suspension member; in combination with a tong bar from which the tongs are suspended, and tong operating means connected to said lifting means and leading along the tong bar to tong actuating means positioned at an end of the tong bar, and wherein said tong operating means includes a bell crank pivotally mounted on the tong bar and having a generally horizontal arm to which the lifting means is connected and an upright arm which is connected by an operating rod to the tong actuating means which is arranged to pull the rod towards the end of the tong bar and thereby raise the slider and open the tong jaws.

25. A combination according to claim 24, comprising six tongs spaced apart along the tong bar, and wherein tong operating means for three of the tongs lead to tong actuating means at one end of the tong bar and tong operating means for the other three of the tongs lead to tong actuating means at the other end of the tong bar.

26. A combination according to claim 24, wherein each tong actuating means includes a crank lever mechanism to which the tong operating means are attached at one side of a pivot, and a striker plate on the lever mechanism at the other side of the pivot for engagement by a downwardly directed pusher rod to rotate the lever mechanism and tension the tong operating means and thereby open the tong jaws.

27. Apparatus according to claim 24, comprising six tongs spaced apart along the tong bar, and wherein tong operating rods for three of the tongs lead to three individual tong actuating means at one end of the tong bar, and tong operating rods for the other three of the tongs lead to three individual tong actuating means at the other end of the tong bar.

28. Apparatus according to claim 27, wherein each said individual tong actuating means includes a crank lever mechanism to which one of said tong operating rods is linked and a striker plate is mounted on the lever mechanism for engagement by a downwardly directed pusher rod to rotate the lever mechanism and pull the tong operating rod towards the end of the tong bar and thereby open the tong jaws.

29. Tongs for suspending glass comprising:
elongate suspension means;
means operable to fix said suspension means at its upper end to a tong bar;
a pair of tong arms including tong jaws movable between open and glass-gripping closed positions;
pivot means pivotally mounting said tong arms, said pivot means being stationary with respect to said suspension means; and
tong control means movable with respect to said suspension means, for pivoting said tong arms about said stationary pivot means to move said tong jaws between said open and closed positions, said tong control means including a weighted slider which, in use of the tongs, is freely slidable vertically on the suspension member, tong links pivotally connected to the tong arms and to the weighted slider, and lifting means attached to the weighted slider and operable independently of the position of glass to be gripped, to raise the weighted slider from a lowermost rest position in which, through the tong links, the slider is effective to bias said tong jaws towards said glass-gripping closed position.

30. Tongs for suspending glass, comprising an elongated tubular suspension member adapted for fixing at its upper end to a tong bar, a pair of tong arms pivoted about a pivot on the tubular suspension member at a fixed distance from its upper end, which tong arms extend beyond the pivot to form jaws of the tongs, tong links pivotally connected to the tong arms and pivotally connected to a weighted slider which is slidable on the tubular suspension member, which tong links are arranged to close the jaws in the rest position of said weighted slider, and said weighted slider comprising a sleeve which is slidable on the suspension member and a tubular weight surrounding the sleeve and attached thereto, and lifting means attached to the slider and operable to raise the slider and open the tong jaws about the pivot on the suspension member, which lifting means comprises a wire passing through the tubular suspension member and attached to a transverse pin whose ends are fitted into the tubular weight and which slides in diametrically opposed longitudinal slots formed in the wall of said tubular suspension member.

31. Tongs according to claim 30, in combination with a tong bar from which the tongs are suspended, a bell crank pivotally mounted on the tong bar and having a generally horizontal arm to which said wire is connected and an upright arm which is connected by a tong operating rod extending along the tong bar to tong actuating means at one end of the tong bar which is arranged to pull the rod towards that end of the tong bar and thereby raise the weighted slider and open the tong jaws.

* * * * *